United States Patent
Holmes et al.

(10) Patent No.: US 8,527,658 B2
(45) Date of Patent: Sep. 3, 2013

(54) DOMAIN TRAFFIC RANKING

(75) Inventors: Alexander D. Holmes, Sterling, VA (US); Andrew W. Simpson, Sterling, VA (US); Karthik Shyamsunder, Winchester, VA (US); Srinivas Sunkara, Ashburn, VA (US); Leonard Orentas, South Riding, VA (US); Mark Kosters, Clifton, VA (US); Dave Moston, Manassas, VA (US); Eduardo Jimenez, Santa Clara, CA (US); Phani Pattapu, Ashburn, VA (US)

(73) Assignee: Verisign, Inc, Reston, VA (US)

( * ) Notice: Subject to any disclaimer, the term of this patent is extended or adjusted under 35 U.S.C. 154(b) by 620 days.

(21) Appl. No.: 12/609,815

(22) Filed: Oct. 30, 2009

(65) Prior Publication Data

US 2010/0257024 A1 Oct. 7, 2010

Related U.S. Application Data

(60) Provisional application No. 61/167,521, filed on Apr. 7, 2009, provisional application No. 61/167,523, filed on Apr. 7, 2009, provisional application No. 61/167,528, filed on Apr. 7, 2009.

(51) Int. Cl.
*G06F 15/16* (2006.01)
(52) U.S. Cl.
USPC ........... 709/245; 709/223; 709/230; 709/224; 709/218; 709/220
(58) Field of Classification Search
USPC .................. 709/245, 223, 230, 224, 218, 220
See application file for complete search history.

(56) References Cited

U.S. PATENT DOCUMENTS 6,233,575 B1 5/2001 Agrawal et al.
7,165,069 B1 1/2007 Kahle et al.
(Continued)

OTHER PUBLICATIONS

Pal et al. "Supporting Sale Content-Inspection of Web Traffic"_In CrossTalk Sep. 1, 2008, pp. 19-23 (retrieved on May 23, 2010). Retrieved from the Internet. <URL:http://www.dist-systems.bbn.com/papers/2008/CrossTalk/080PalAtighetchi.pdf> entire document, especially: p. 19, col 2, para 2 and col 3. para 2; p. 20, col 2. para 3 and col 3, para 2-3; p. 21. col 1, para 2-3.

(Continued)

*Primary Examiner* — Lan-Dai T Troung
(74) *Attorney, Agent, or Firm* — MH2 Technology Law Group, LLP

(57) ABSTRACT

An automated method for determining domain traffic including receiving at authoritative name server a request to resolve a domain name that has n labels separated by periods. The leftmost label is the first label and the top level domain is the nth label. If the first label of the received domain name includes the string "www", then a www hit counter and/or a www requesting server counter for the domain name are incremented. If the received domain name has only two labels, then an exact hit counter and/or an exact requesting server counter for the domain name are incremented. If the first label of the received domain name does not include the string "www" and does not have only two labels, then another hit counter and/or another requesting server counter for the domain name are incremented. A domain traffic score is calculated based upon a plurality of the counters, and calculating the domain traffic score includes applying a weighting factor to at least one of the counters.

9 Claims, 9 Drawing Sheets

(56) References Cited

U.S. PATENT DOCUMENTS

| | | |
|---|---|---|
| 7,260,834 B1 | 8/2007 | Carlson |
| 7,260,837 B2 | 8/2007 | Abraham et al. |
| 7,472,201 B1 | 12/2008 | Aitken |
| 7,849,507 B1 | 12/2010 | Bloch et al. |
| 2002/0032772 A1 | 3/2002 | Olstad et al. |
| 2004/0111438 A1 | 6/2004 | Chitrapura et al. |
| 2004/0128285 A1 | 7/2004 | Green et al. |
| 2005/0076222 A1 | 4/2005 | Olkin et al. |
| 2005/0223093 A1 | 10/2005 | Hanson et al. |
| 2006/0010215 A1* | 1/2006 | Clegg et al. ............. 709/206 |
| 2006/0112176 A1 | 5/2006 | Liu et al. |
| 2006/0282883 A1 | 12/2006 | Rosenberg et al. |
| 2007/0033275 A1 | 2/2007 | Toivonen et al. |
| 2007/0073758 A1 | 3/2007 | Perry et al. |
| 2007/0130316 A1 | 6/2007 | Turakhia |
| 2007/0192190 A1 | 8/2007 | Granville |
| 2008/0022013 A1 | 1/2008 | Adelman et al. |
| 2008/0028443 A1 | 1/2008 | Adelman et al. |
| 2008/0082662 A1 | 4/2008 | Dandliker et al. |
| 2008/0091524 A1 | 4/2008 | Yan et al. |
| 2008/0867741 | 4/2008 | Feldman et al. |
| 2008/0163369 A1 | 7/2008 | Chang et al. |
| 2008/0177994 A1 | 7/2008 | Mayer |
| 2008/0281676 A1* | 11/2008 | Stahura et al. ............. 705/10 |
| 2009/0049524 A1* | 2/2009 | Farrell et al. ............. 726/4 |
| 2009/0070453 A1 | 3/2009 | Douglis et al. |
| 2009/0132524 A1 | 5/2009 | Stouffer et al. |
| 2010/0299317 A1* | 11/2010 | Uy ............. 707/706 |

OTHER PUBLICATIONS

International Search Report and Written Opinions corresponding to PCT/US2010/30207 application.

International Search Report and Written Opinion corresponding to the PCT/US10/30211 application.

"Domain Name System," Wikipedia.org; edit date Mar. 21, 2009; pp. 1-15; accessed <http://en.wikipedia.org/w/index.php?title=Domain_Name_System&oldid=27867803 >.

\* cited by examiner

DOMAIN TRAFFIC RANKING

BACKGROUND OF THE INVENTION

Understanding user activity on the Internet is becoming more important, and more difficult, as the Internet continues to expand. Commercial use of the Internet is one area that has expanded dramatically in the last decade, and one that has a particular interest in understanding, monitoring and predicting user activity. One significant aspect regarding the commercial use of the Internet is advertising. Advertisers may use factors such as traffic rankings in determining an appropriate web site or domain to advertise particular content. Likewise, web site owners may use traffic ranking to establish an appropriate fee for advertising on their web site. As known by those of skill in the art, Internet advertising has also taken many different forms that may directly demonstrate the effectiveness of a particular advertisement, such as pay per click (PPC) applications. However, traffic rankings are still an important aspect of Internet advertising, as well as other aspects of Internet infrastructure management. For example, as the number of active web sites on the Internet grows, there is an increased demand for accurate traffic ratings to inform decisions such as server management, web development, advertising focus and rates. However, there are limitations on the capabilities of conventional traffic monitoring services, that typically monitor the traffic of users or web sites to calculate traffic scores.

A description of the ways in which the Internet is intrinsically organized can be helpful in understanding the challenges related to efficiently monitoring and rating the traffic for particular web sites on the Internet.

The process of establishing a web site on the Internet typically begins with a registrant registering a specific domain name through a registrar. The registrant is typically an individual or organization that identifies a domain name, such as "example.com". The registrant contacts a registrar to process the name registration. The registrar sends the necessary domain name service (DNS) information to a registry. A registrar may maintain a database containing additional customer information beyond that which is sent to the registry.

The registry receives DNS information from registrars, inserts that information into a centralized database and propagates the information in Internet zone files on the Internet so that domain names can be found by users around the world.

In general, the DNS is the part of the Internet infrastructure that translates human-readable domain names into the Internet Protocol (IP) numbers needed to establish TCP/IP communication over the Internet. That is, DNS allows users to refer to web sites, and other resources, using easier to remember domain names, such as "www.example.com", rather than the numeric IP addresses, such as "123.4.56.78", assigned to computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g. the "example" level in "www.example.com". Each second-level domain can include a number of third-level domains located immediately to the left of the second-level domain, e.g. the "www" level in "www.example.com". There can be additional level domains as well, with virtually no limitation. For example, a domain with additional domain levels could be "www.photos.example.com".

Additional non-domain information may be included in a Uniform Resource Identifier ("URI") structure that includes the domain name. For example, a "path" part is a sequence of segments (conceptually similar to directories, though not necessarily representing them) separated by a forward slash ("/"). This information may be included immediately to the right of the domain name, such as the "blog" in "www.example.com/blog", and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page that may be part of the same, or a different, domain.

Related domain names, and content, may be organized in a hierarchical, or nested, manner, such as "www.example.com"; "www.blog.example.com"; "www.example.com/blog"; or "blog.example.com" etc, each with a different significance. Such related domains need not share similarities in the actual IP address to which the various domain names resolve to. In this regard, part of the domain name may signify a particular server which is desired, for example, "mail.example.com" and www.example.com" may resolve to different servers, with different functions, for the same second-level domain.

The above registration and structural aspects of the Internet are then used by end-user applications to find specific resources on the Internet by using the DNS resolution process. Aspects of the DNS resolution process are discussed below to aid in an understanding of the subject matter of the present application.

The responsibility for operating each TLD (including maintaining a registry of the second-level domains within the TLD) is delegated to a particular domain name registry. The registry is responsible for converting domain names to IP addresses ("resolving") through DNS servers that maintain such information in large databases, and operating its top-level domain. The DNS stores IP addresses and domain names, facilitating service to addresses in TLDs, such as .com, .net, .edu, and .tv. Resolving is the process by which domain names are matched with corresponding IP numbers. Resolving is accomplished by a combination of computers and software, referred to as name servers, that use the data in the DNS to determine which IP numbers correspond to a particular domain name. The following general definitions will be used herein.

Resolve: To translate domain name to IP address.

Resolver: A computer issuing a query in order to resolve a domain name.

Name server: A computer receiving queries and answering them directly or via resolve against other name servers.

Subnet: A group of IP addresses sharing octets of the IP address.

Set of resolvers: A group of resolvers that are considered together based on an a determined association, such as, for example, subnets, geographic association, managing entities, and other IP address association.

Internet domains can be divided to groups according to their TLD suffix (e.g. .com, .net, .co.uk . . . ) with different registries responsible for each of them. A single registry may be responsible for several of these groups, such as the VeriSign® registry which is responsible for .com and .net domains.

The DNS is maintained by a distributed database system, which uses the client-server model. The nodes of this database are the name servers. Each domain or subdomain has one or more authoritative DNS servers that publish information about that domain and the name servers of any domains subordinate to it. The top of the hierarchy is served by the root name servers, the servers to query when looking up (resolving) a TLD.

The DNS distributes the responsibility of assigning domain names and mapping those names to IP addresses by designating authoritative name servers for each domain. Authoritative name servers are assigned to be responsible for their particular domain.

In theory a fully qualified domain name may have several name segments, (e.g. "www.one.type.example.com." In practice, domain names will frequently consist of just three segments. For querying purposes, the name segment is typically interpreted by segment, from right to left. At each step along the way, a corresponding DNS server is queried to provide a pointer to the next server which it should consult.

Because of the huge volume of requests generated by DNS, the resolution process also allows for caching (i.e. the local recording and subsequent consultation of the results of a DNS query) for a given period of time after a successful answer. How long a resolver caches a DNS response (i.e. how long a DNS response is considered valid) is determined by a value called the time to live (TTL). The TTL is generally set by the administrator of the DNS server handling the response. The period of validity may vary from just seconds to days or even weeks.

Based on the DNS structure, as well as the caching function, there are two classifications typically applied to the name servers, authoritative and recursive (caching). An authoritative name server is a name server that gives original, definitive answers ("authoritative" answers) to DNS queries. Every domain name must be assigned a set of authoritative name servers that are responsible for resolving the domain name.

As indicated above, the DNS also uses recursive cache servers, which store DNS query results for a period of time determined TTL of the domain name record in question. Typically, such caching DNS servers also implement the recursive algorithm necessary to resolve a given name starting with the DNS root through to the authoritative name servers of the queried domain. Internet service providers (ISPs) typically provide recursive and caching name servers for their customers. In addition, many home networking routers implement DNS caches and recursors to improve efficiency in the local network.

DNS "stub" resolvers are also known that essentially operate as a cache-less application to resolve DNS names into IP addresses. The DNS stub resolver forwards DNS queries to the DNS server configured for the workstation (or server) and returns the DNS server's response to the requesting software. If a stub resolver queries a caching nameserver for a record that is being held by the caching server before the TTL has expired, the caching server will reply with the cached resource record rather than retrieve it from the authoritative name server again.

SUMMARY OF THE INVENTION

There are currently several approaches used to provide web traffic information. Known methods include panel-centric approaches in which selected samples of users are provided with a client agent that monitors their web traffic usage. There are also site-centric approaches in which web traffic statistics are gathered directly from the web server for a web site. Other methods focus on the ISP, and gather web usage traffic from logs of ISP's that are providing the web data to the client. However, the known methods each suffer from drawbacks related to the point at which the data is gathered, the amount of data gathered and/or the materiality of the data that is gathered. For example, panel-centric applications are limited in their ability to obtain holistic views of activity on the Internet because they are limited to the selected users who are being monitored. Additionally, any attempt to catalogue the activities of the billions of individual Internet users, even if possible, would create massive amounts of data that would quickly reach an unmanageable level. Likewise, the traffic scores for individual web servers are of limited value based on the isolated nature of the data gathered by that particular server, as well as the potential need to verify the reporting of a server when the operator may have an interest in reporting high traffic volume. Such traffic monitors are also susceptible to various types of spoofing that can interfere with and/or artificially inflate traffic volume. ISP's are also limited in their ability to characterize the overall activity of the Internet based on their particular client base, geographical interests, and other factors that inherently or implicitly restrict the traffic that the particular ISP is privy to.

There are additional problems in determining accurate and meaningful traffic rankings for domains. In general, Internet traffic can be divided into two groups: user oriented traffic, and machine oriented traffic. User oriented traffic can be considered as activity generated by users browsing web sites. Machine oriented traffic can be considered as activity generated by automatic processes and services (e.g. antivirus updates, operation system updates, web services, etc.). For the purposes of commerce, including online advertising, identifying the user generated traffic driven into web sites is particularly important. Therefore, methods for measuring the user oriented traffic are preferable. However, this is a significant challenge because, for example, information regarding the nature of the requestor cannot be obtained from the incoming queries themselves. Another challenge in distinguishing between the traffic types is caused by the architecture of the Internet DNS system, which refers queries initiated by intermediate DNS resolvers. This can obscure the nature of the end-user that initiated the request.

The present subject matter addresses many of the above issues through various mechanisms using DNS traffic data obtained at the TLD DNS servers. According to aspects of the invention, domains across the Internet can be ranked in ways that known systems do not contemplate or achieve. In embodiments, several attributes and/or measurements may be obtained from the DNS traffic seen at the TLD DNS server for various domains, and used to calculate traffic scores. The calculated scores may be used to rank the domains.

The inventors have recognized that a challenge in converting DNS data into a meaningful and useful form is the size of the DNS data. Registries may operate several resolution sites located at different parts of the world. The sites for one registry may answer over thirty four billion queries a day. This huge number of queries presents an overwhelming challenge in attempts to analyze raw data. The present application provides systems and methods for data aggregation that may reduce the overall amount of data into a more manageable size. According to these methods, it has also been found that a more accurate picture of meaningful activity on the Internet can be developed, beyond what has been achieved by conventional methods using raw traffic data.

Disclosed methods may include different aggregation formats including, for example, domain summarized traffic information, which may list several statistics per domain per day, and domain detailed traffic information, which may list more detailed information about DNS queries. It has been found that a particularly useful example of DNS query information are the identities of sets of resolvers generating the queries.

Embodiments may include distinguishing between types of addresses requested in DNS queries. For example, embodiments may separately recognize exact requests, "www" requests, and other requests. As used herein, an exact request is a request that matches a predetermined criteria, such as a specific number of labels. Exact requests may be identified in embodiments as containing two labels, such as an exact $2^{nd}$ level domain name requested without any prefix. For example, an exact request for the domain "example.com" may be "http://example.com/".

A "www" request is a request in which the character string "www" is included in a prefix. For example, a request that reads "http://www.example.com/", "http://www1.example.com/", and "http://AAA-www.example.com/", are recognized as "www" requests. As used herein, an "other" request is a request that does not meet either of the "exact" or "www" criteria. This may include other prefixes as part of the request. For example, "http://jobs.example.com/", "http://mail.example.com/", and "http://AAA.BBB.example.com/", would be recognized as "other" requests, if no corresponding exact match was identified.

In embodiments, the following exemplary attributes about DNS queries for a domain may be obtained and used to calculate ranking:

WWW request hits. A count of hits on DNS records with "www" in the first label.

Exact request hits. A count of hits on DNS records with only two labels, e.g, only "example.com".

Other request hits. A count of hits on DNS records which fall into neither category above.

As discussed further below, embodiments may also includes applying appropriate weighting factors to the various request hits for a domain in determining traffic and/or ranking scores.

Embodiments may include accounting for the following attributes related to the originating IP address, subnets, and/or sets of resolvers, of DNS queries, and using them to calculate the ranking:

WWW server count. A count of unique downstream IP addresses or sets of resolvers hitting a DNS record with "www" in the first label.

Exact server count. A count of unique downstream IP addresses or sets of resolvers hitting a DNS record with only two labels.

Other server count. A count of unique downstream IP addresses or sets of resolvers hitting DNS records which fall into neither category above.

As discussed further below, embodiments may also includes applying appropriate weighting factors to the various server counts for a domain in determining traffic and/or ranking scores.

Embodiments may include calculating the traffic and/or ranking scores based on a TTL of DNS records for the domain.

Embodiments may include an automated method for determining domain traffic. Exemplary methods may include receiving, at an authoritative name server, a request to resolve a domain name that has n labels separated by periods. The leftmost label may be considered to be the first label and the TLD is the nth label. If the first label of the received domain name includes the string "www", then a www counter for the domain name may be incremented. If the received domain name has only two labels, then an exact counter for the domain name may be incremented. If the first label of the received domain name does not include the string "www" and does not have only two labels, then an other counter for the domain name may be incremented. A domain traffic score may be calculated based upon a plurality of the counters. Calculating the domain traffic score may include applying a weighting factor to at least one of the counters.

Embodiments may include receiving, at an authoritative name server, a request to resolve a domain name as indicated above. If the first label of the received domain name includes the string "www", then at least one of a www hit counter and a www requesting server counter for the domain name may be incremented. If the received domain name has only two labels, then at least one of an exact hit counter and an exact requesting server counter for the domain name may be incremented. If the first label of the received domain name does not include the string "www" and does not have only two labels, then at least one of an other hit counter and an other requesting server counter for the domain name may be incremented. A domain traffic score may be calculated based upon a plurality of the counters. Calculating the domain traffic score may include applying a weighting factor to at least one of the counters.

Embodiments may include wherein the authoritative name server is a TLD name server.

Embodiments may include limiting the number of increments that register on particular counters for a predetermined period of time. For example, a requesting server counter may be limited to one increment (count) per 24-hour period. Embodiments may include resetting the counter after the predetermined period of time.

Embodiments may include calculating a ranking score based on the relative traffic score for a domain. This may include comparing the domain traffic score with other domain traffic scores. Calculated traffic and/or ranking scores may be automatically distributed as part of a fee service, or used in determining other items such as an advertising rates, etc.

Further advantages of the present subject matter will become apparent to those of ordinary skill in the art upon reading and understanding the following detailed description of the preferred embodiments.

DETAILED DESCRIPTION OF EMBODIMENTS

The following detailed description is provided with reference to exemplary embodiments for the ease of description and understanding. Applicants' invention is not limited to the disclosed embodiments, and encompasses other variations that fall within the overall scope of description provided herein.

Figure 1:
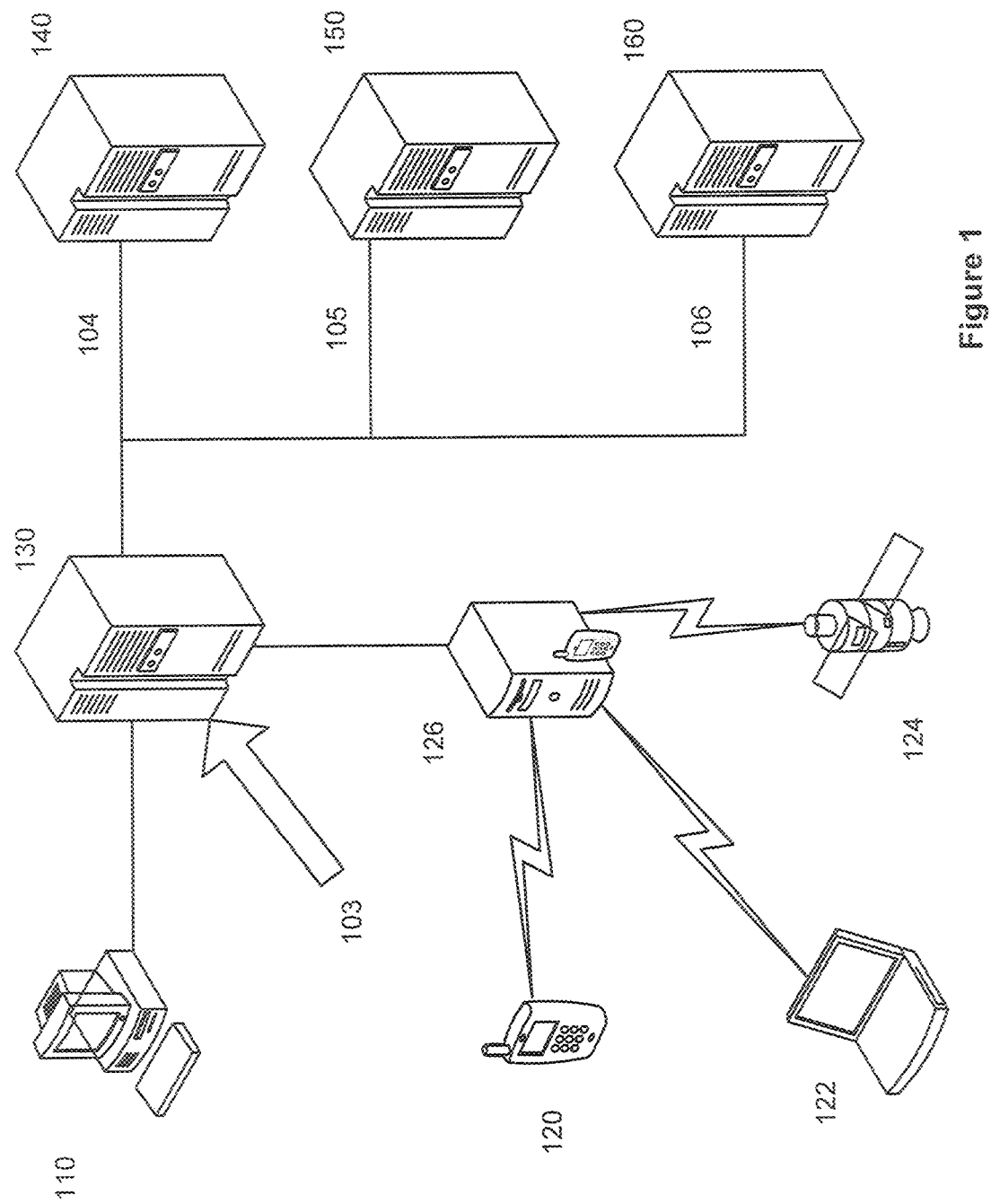
FIG. 1 depicts an exemplary system and related network in accordance with an embodiment of the present invention.

As indicated above, embodiments of the present invention may involve operations on a network, such as the Internet environment depicted in FIG. 1. A client computing device 110 may initiate a DNS request 103 to recursive name server 130. As suggested by FIG. 1, DNS requests 103 can be originated, or transmitted to recursive name server 130, from various sources such as mobile device 120, wireless computing device 122, other communication link 124, and/or intermediate network servers 126. The DNS request to resolve a domain name typically has n labels separated by periods. These labels are usually in some form that is easier to remember than the numerical IP address for a desires Internet resource, e.g. a web page. For the ease of description, the leftmost label may be considered to be the first label and the TLD is the nth label. Thus, in a request for "www.example.com", n=3, the first label would be "www" and the TLD would be ".com". As described above, the recursive name server 103 may transmit the DNS request to various authoritative servers 140, 150, 160 as part of the recursive name resolution. Alternatively, the requested DNS information may reside in a cache of recursive name server 130, subject to the DNS record's TTL, in which case, the query may be answered without referring to the authoritative name servers 140, 150, 160.

Figure 2:
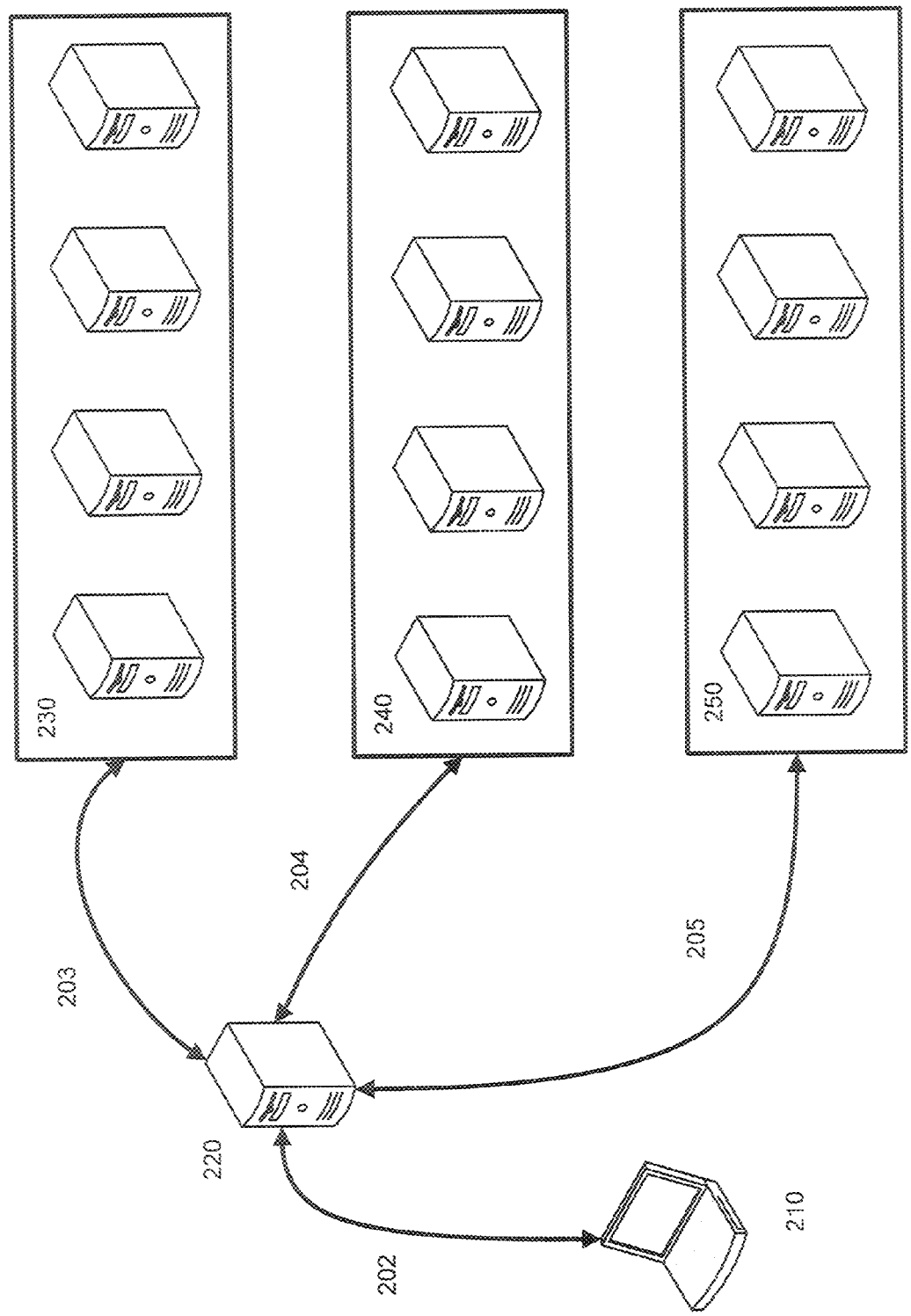
FIG. 2 depicts an exemplary system and related network in accordance with an embodiment of the present invention.

FIG. 2 depicts additional details regarding a recursive name server 220 and its interaction with authoritative name servers 230, 24, 250. In FIG. 2, authoritative servers 230 are root level authoritative servers. Each of these servers contain information for particular TLDs on the Internet. The root level servers can direct requests for domains within their TLD to other authoritative servers managed by that TLD registry. For example, DNS request 202 from client 210 may include a request for "www.example.com". Recursive name server 220 may first check an internal cache for a corresponding DNS record. If one is not found, the DNS request may be forwarded at 203 to root level authoritative name servers 230. An authoritative root level server among servers 230 that is responsible for ".com" may return DNS information for "example.com" directing the requestor to authoritative name servers 240, in this case these servers represent the constellation of servers for a registry of ".com". As described herein, DNS requests, e.g., 203, 204, 205, can be counted at various authoritative servers, e.g., 230, 240, 250. In embodiments, the counting may be done at a TLD name server such as, for example, 230. Other authoritative name servers 240, 250 can also count DNS hits for those records handled by the respective server. Embodiments may include combining the scores from various servers, and/or TLDs, e.g. ".com.", ".net", ".edu", ".uk", to arrive at combined rankings.

Figure 3:
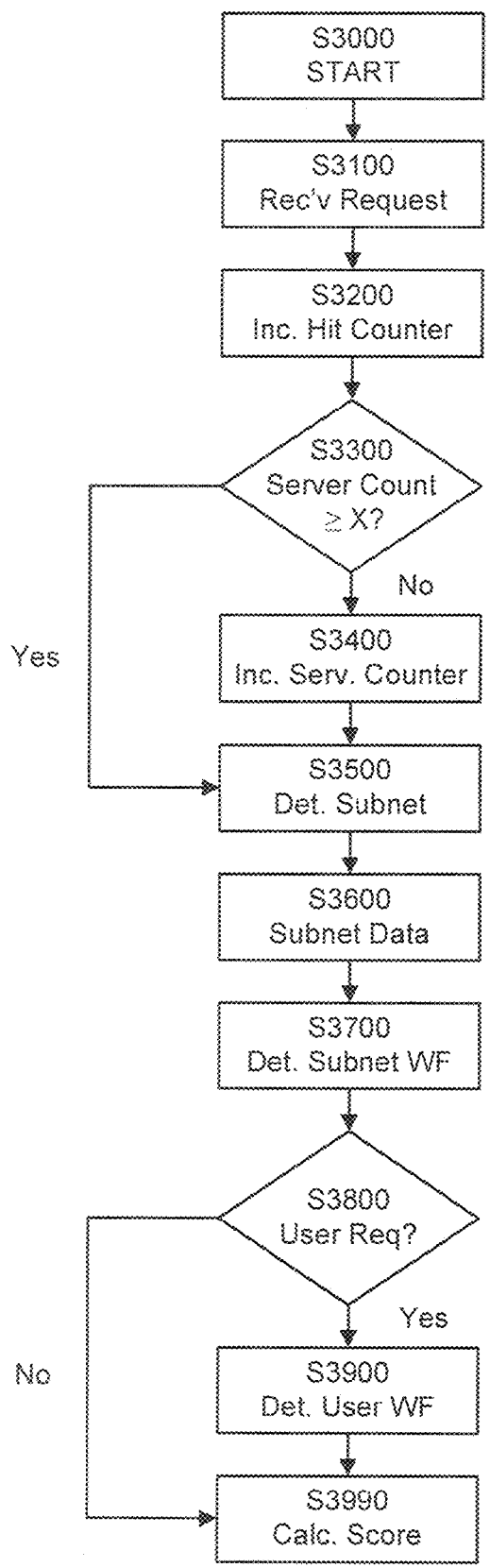
FIG. 3 depicts aspects of an exemplary method in accordance with an embodiment of the present invention.

In embodiments, determinations may be made to count a request or not count a request on a given counter. For example, certain counters, such as a "server counter", may be limited to a single count per a predetermined period of time. As depicted in FIG. 3, a request may be received in S3100. A relevant hit counter may be incremented in S3200. In S3300 a determination may be made whether to increment a server counter. In this example, a current count of the server counter may be compared to a predetermined value "X". If the server count is greater than, or equal to, X, the determination is made not to increment the server counter again, and the method may proceed to S3500. If the server count is less than X, the method may proceed with S3400 where the server counter is incremented. The server count may be automatically reset after the predetermined period of time. Although described in the context of a server counter, other counters may be limited in similar manner, such as, counters associated with a particular IP address, set of resolvers, etc. As described further below, limiting the count of certain counters may be used to develop a more accurate picture of meaningful Internet activities. These limited counters may be considered alone or in combination with hit counters to provide users with a manageable and accurate representation of overall web traffic. For example, using a limited counter may reduce the unwanted effects of artificial or unreliable traffic indicators, that may originate from a particular server, set of resolvers, IP address, etc.

Figure 4:
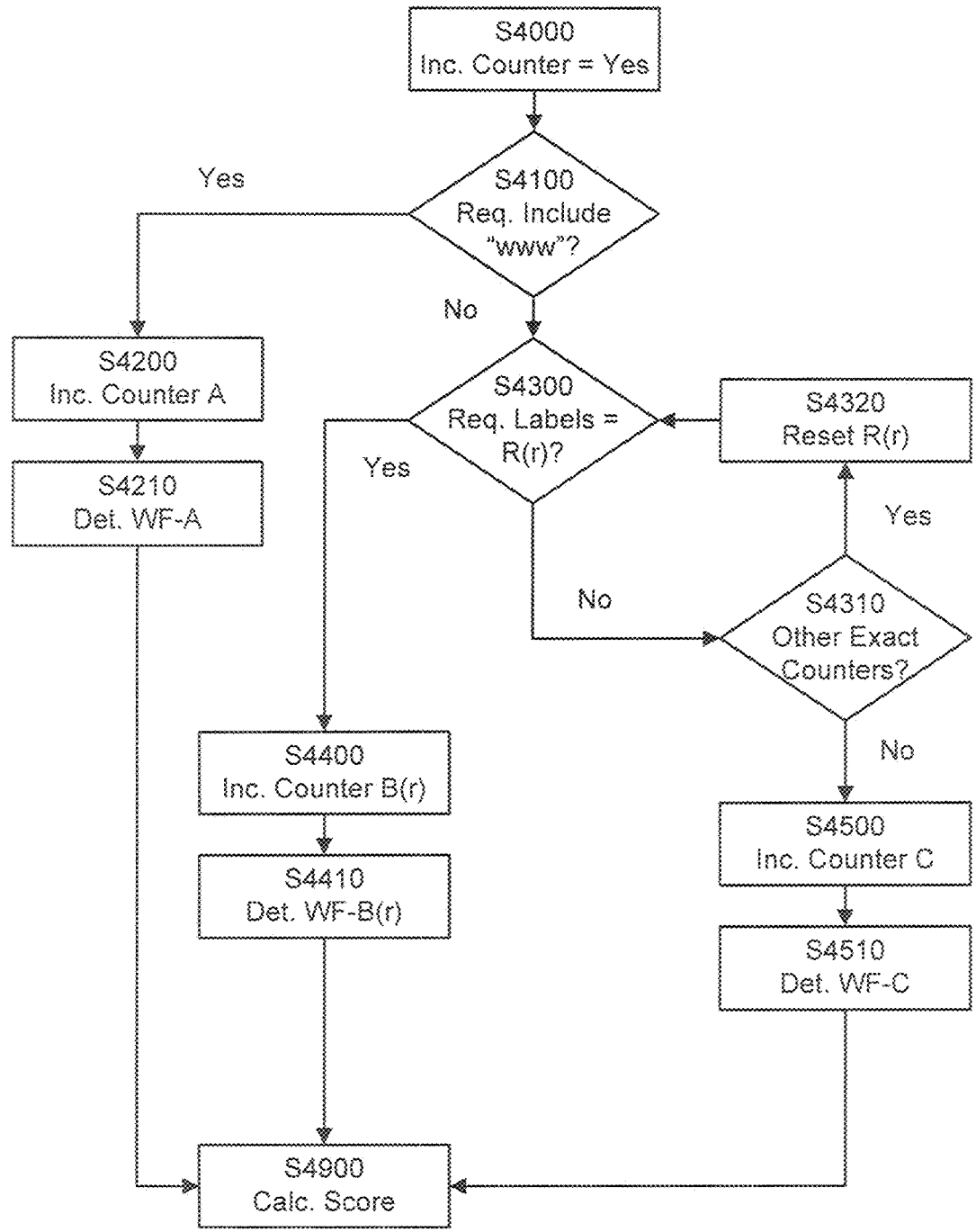
FIG. 4 depicts aspects of an exemplary method in accordance with an embodiment of the present invention.

With reference to FIG. 4, exemplary methods may include determining if a counter is to be incremented with respect to a received request in S4000. As detailed above, in some embodiments, a hit counter may be incremented for received DNS requests for a domain. In some instances, it may be determined that a limited counter will not be incremented. In the event that the counter in question will be incremented, the method may proceed with S4100.

In S4100, the request may be evaluated to determine whether the first label of a received domain name includes the string "www". The string may be an independent part of the requested address, as in the case of "www.example.com", or nested with other characters, such as "www1.example.com". If it is determined that the first label includes the string "www", then the method may proceed with S4200, where a counter "A" may be incremented, such as a www counter for the domain name. If the first label of the received domain name does not include the string "www", the method may proceed to S4300.

In S4300, the request may be evaluated to determine whether the labels satisfy a predetermined condition "R(r)". R(r) can take numerous forms including a predetermined number of labels, a specified string, or other features of DNS request. In the case of designating a number of labels, described embodiments include where R(2)=two labels. If the received domain name has only the predetermined number R(2) of labels, e.g. two labels in "example.com", then the method may proceed to S4400, where a counter B(r) is incremented, such as a two-label "exact" counter B(2) for the domain name. If the request does not have only the designed number R of labels, e.g. it has more than two labels when the predetermined number R of labels is two, then the method may proceed with S4310. Embodiments may include a plurality of B counters, e.g. multiple exact counters. These may include, for example, separate counters for various numbers for R(r), or different versions, of "exact" counters for exact portions of domain strings. As an example, an additional counter B(3) may be incremented in response to a request for "mail.example.com", in which R=3. As another example, requests with a particular string, e.g. "mail", may be counted by a counter, B("mail"), when the request contains the string, e.g. "mail5.example.com". This may be implemented by determining whether additional exact counters B(r) are being implemented in S4310. If there are other exact counters, the method may proceed to S4320 where R(r) may be reset to the new value for counter B(r). After R(r) is reset, the method may continue back to S4300 to determine if the requests satisfies the new criteria R(r). S4300, S4310 and S4320 can be reiterated until R(r) is satisfied, or there are no remaining exact counters. If there are no remaining exact counters, the method may proceed to S4500.

In S4500, a counter "C" may be incremented, such as a miscellaneous counter for the domain name. Although it is not required to count miscellaneous requests, i.e. requests that do not meet any of the preceding categories, a miscellaneous counter may provide advantages in evaluating the meaningfulness of detected traffic. For example, a miscellaneous counter may be used in comparison with the www counter and the exact counter(s) to determine a percentage of traffic that is apparently driven by human interaction.

In S4210, S4410, and/or S4510, a weighting factor may be determined and/or assigned to the counters A, B(r) and/or C, respectively. Weighting factors may be applied to all, or less than all, of the counters for a domain. For example, a weighting factor may be applied to one, two, or all counters for a domain. Assigning a weighting factor can be based on several factors related to the nature of the counter and other information gathered with respect to the domain. Weighting factors may also be applied in a dynamic manner. For example, over the course of time, the counts of the different counters for a domain may change or information may be developed regarding the domain. This may prompt a change in one or more of the weighting factors applied to the counters for the domain. The method may continue with S4900

In S4900, a score may be calculated for the domain, such as a traffic score. The traffic score may be based on a plurality of the counters. It should be noted that it is not required to use counts from all of the relevant counters. Scores may be calculated based on one, two or more counts, with any relevant weighting factors considered. Thus, a domain traffic score may be calculated based upon a plurality of the counters, and may include applying a weighting factor to at least one of the counters.

As indicated previously, when a recursive name server gets an answer to a DNS query, it may cache it for future use. The time that each answer is saved in the cache is based on the TTL. The inventors have observed that measuring a domains' traffic by the total number of queries targeting the domain may have inaccuracies based on the caching function and the TTL for the DNS record. Compensating for the caching function can be particularly difficult in large-scale implementations based on the fact that each domain/resolver may manage its TTL differently. For instance, a resolver may refresh its cache every 6 hours, while another resolver may refresh its cache every 12 hours. Even if both resolvers are asked for a given domain the exact number of times, roughly speaking, the first resolver would be expected to generate twice as much query traffic up the DNS chain for this domain, compared to the second, even though both resolvers are representing the same amount of user-generated traffic to the domain. The inventors have developed several features to address this issue.

As a first example, a weighting score may be applied in S4900 based on a TTL for the DNS file. This can compensate, somewhat, for limitations of hit counters linked to authoritative name servers, that only see requests that are actually forwarded to the server. Based on the number of requests forwarded to the server, a weighting factor based on the TTL can be used to calculate an estimate of the total traffic that is being directed to the domain. In general, traffic for sites with a relatively long TTL may receive a higher weight factor than those with shorter TTLs. Weighting factors can be established based on a ratio of TTLs among the scored/ranked domains.

As another example, disclosed methods may be directed to observing the number of distinct querying IP addresses, sets of resolvers, and the like, which has been found to introduce less noise and less dependence on the TTL and caching policy of each individual resolver. This approach has been found to be particularly useful in the field of observing traffic at the level of the TDL and other authoritative name servers, which may see enormous volumes of overall traffic. The metric of unique querying IP addresses, sets of resolvers, and the like, can also prevent large offsets received by the total hit counters. For example, rather than relying exclusively on a total volume of traffic reflected by a hit counter, each distinct querying IP addresses, sets of resolvers, and the like, may be counted only once per predetermined period of time, e.g. a 24-hour period.

In this regard, it is useful to consider two types of metrics: Hits (H): The total number of queries generated for a given domain.
Sets of resolvers (S): The number of distinct resolver IP addresses, subnets, sets of resolvers, and the like generating queries for a given domain.

As discussed above, a given query can request one of three types of domain targets: www, Exact, Other. The inventors have observed several factors that help to meaningfully interpret the nature of the traffic based on the counts of the respective requests. This can help in understanding the extent to which each query of a particular type reflects user traffic, as opposed to non-user traffic, such as web services, etc.

With regards to www queries, it may be assumed that the majority of traffic referring to such targets is user-oriented. However, while www queries typically reflect user-oriented traffic in a domain, they do not always comprise all of the user-oriented traffic for the domain. It has been found that, for some domains, a portion of the user-oriented traffic resides within the "Exact" and "Other" metrics. For instance, the inventors have found that, for some popular web sites, less than 10% of the requests fall within the www category. Therefore, calculating a score based only on the www metric can result in certain web sites being ranked much lower than they should be based on the actual traffic that the web site is seeing. This has been found to be particularly relevant in evaluating the popularity of large domains in which the "Other" queries may comprise a large proportion of user-oriented traffic. For instance, a domain "example.com" may see most traffic directed to popular sub-domains, e.g. mail.example.com; games.example.com; news.example.com; etc.

Figure 7:
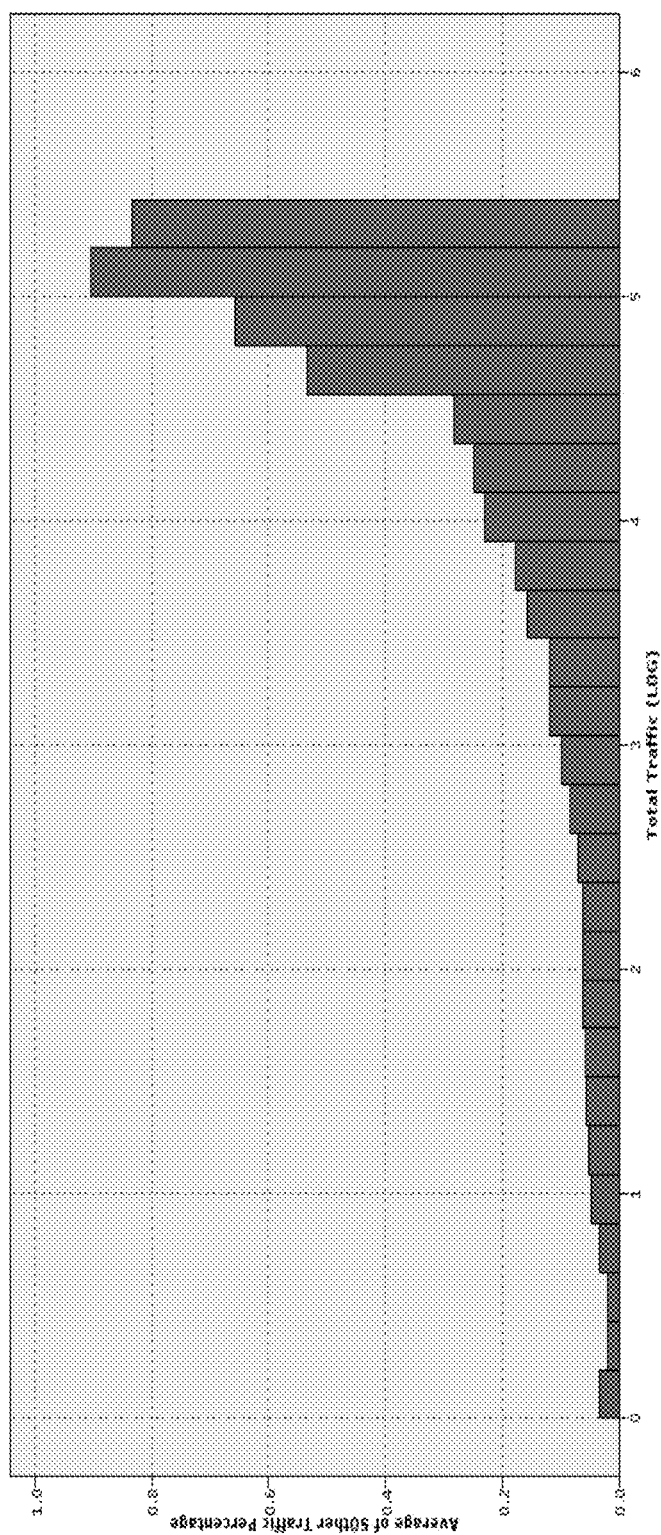
FIG. 7 depicts a chart reflecting a relation between domain traffic size and the percentage of the traffic going to the "Other" targets.

The inventors have found that there is high correlation between the size of the domain (i.e. amount of its traffic) and the percentage of its "Other" traffic out of its overall traffic. FIG. 7 illustrates the relation between domain traffic size (in log space) and the percentage of the traffic going to the "Other" targets (sub-domains). Note that the value of each bar is the average of the percentage of all domains located in that bar.

This shows a clear relation between the two factors, meaning larger domains tend to have higher percentage of their total traffic in the "Other" traffic. Thus, the significance of "Other" traffic may vary depending on the overall level of traffic for a domain. This observation has been taken into account in formulating the various methodologies described herein. For example, although other traffic may normally be given a lower weight factor than exact traffic, in embodiments, the weight factor for other traffic may be increased according to relative traffic volume.

In many of the referrals to web sites by users, the "www" prefix is omitted (e.g. "example.com"). However, the ratio of user-oriented to non-user oriented traffic reflected by such requests, and hence the significance of the "exact" requests, has been uncertain.

Figure 8:
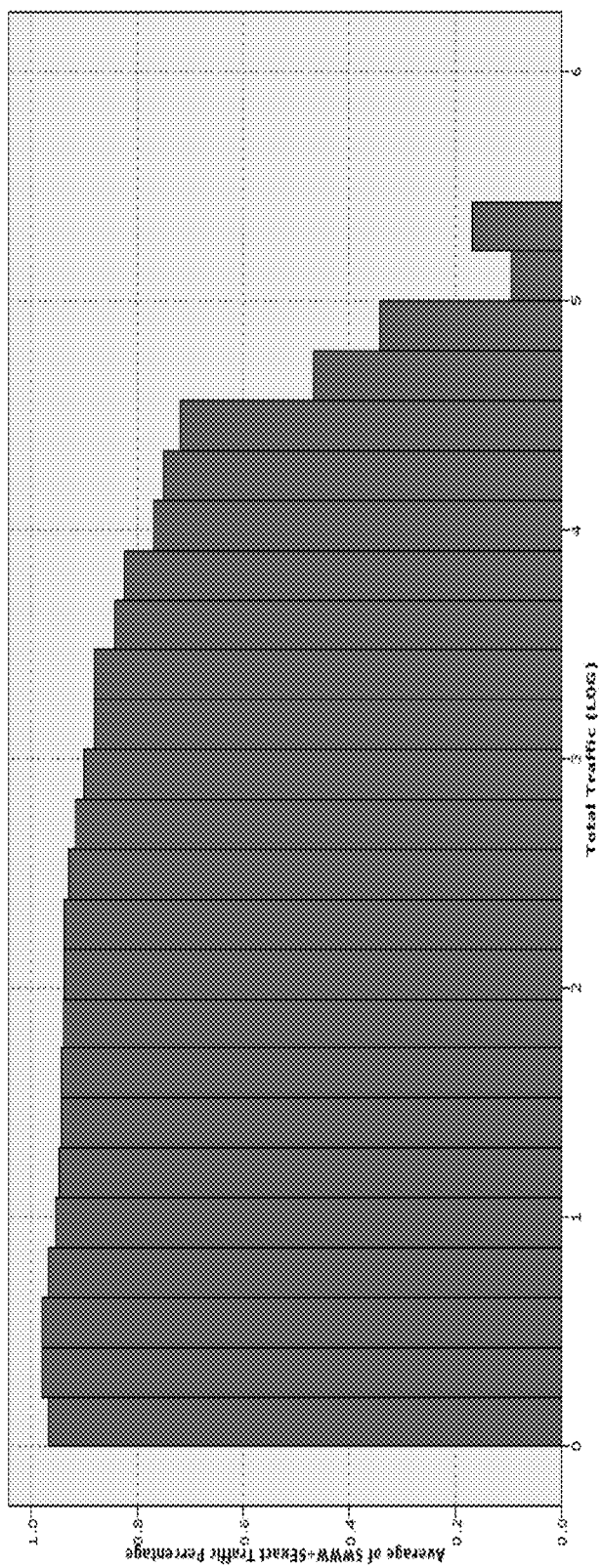
FIG. 8 depicts a chart reflecting a relation between domain traffic size and the percentage of the traffic going to the "WWW" and "Exact" targets.

Surprisingly, the inventors have observed that considering both of the "www" and "exact" traffic metrics yields particularly favorable results. While the "exact" metric by itself does not fulfill a clear trend or consistency, when combined with the "www" metric, a clear pattern is observed. Thus, it has been determined that the two metrics complement one another in an unexpected way, as shown in FIG. 8.

The inventors have relied on the foregoing observation to develop a streamlined and accurate approach for measuring a given domain's performance by comparing its incoming traffic in a given period to the overall traffic in that period. In embodiments, all three DNS target types may be included, e.g. www (W), exact (E) and other (O), and each may be assigned a different weight. As an additional feature, "set of resolvers" metrics may be used, alone, or in combination with "Hit" metrics. For example, the following represents an embodiment of the disclosed methodologies:

Calculate each domain's W/E/O average daily ratios for the given period; in other words, for each domain, calculate the average of its daily ratio between its distinct set of resolvers metric and the overall number of distinct sets of resolvers that day. This can be done for each of the target types individually; W/E/O:

$$SW\_Ratio(D, P) = \frac{1}{|P|} \cdot \sum_{Day_i \in P} \frac{SW(D, Day_i)}{SW(All, Day_i)}$$

$$SE\_Ratio(D, P) = \frac{1}{|P|} \cdot \sum_{Day_i \in P} \frac{SE(D, Day_i)}{SE(All, Day_i)}$$

$$SO\_Ratio(D, P) = \frac{1}{|P|} \cdot \sum_{Day_i \in P} \frac{SO(D, Day_i)}{SO(All, Day_i)}$$

Where D is Domain; P is Period (|P| is the size of the period in days); and SW/E/O (All, $Day_i$) is the overall number of distinct sets of resolvers querying W/E/O accordingly.

Calculate the overall score for the domain within the given period:

$$Score(D, P) = \frac{W_W \cdot SW\_Ratio(D, P) + W_E \cdot SE\_Ratio(D, P) + W_O \cdot SO\_Ratio(D, P)}{W_W + W_E + W_O}$$

Where $W_{W/E/O}$ is the weight of each of the target types W/E/O accordingly. In a preferred embodiment, the following approximate weights may be used in the above equation.
$W_W=1$
$W_E=0.5$
$W_O=0.2$ In other embodiments, the weighting factors can be described more generally. For example, $W_W \geq W_E \geq W_O$. As suggested previously, $W_O$ can be adjusted according to traffic volume. For example, $W_O$ may be corrected as $W_O=(W_O K)$, where K is a relative factor of domain traffic volume such that $K \geq 1$ represents a relatively high volume of traffic, and K represents a relatively low volume of traffic.

Figure 9:
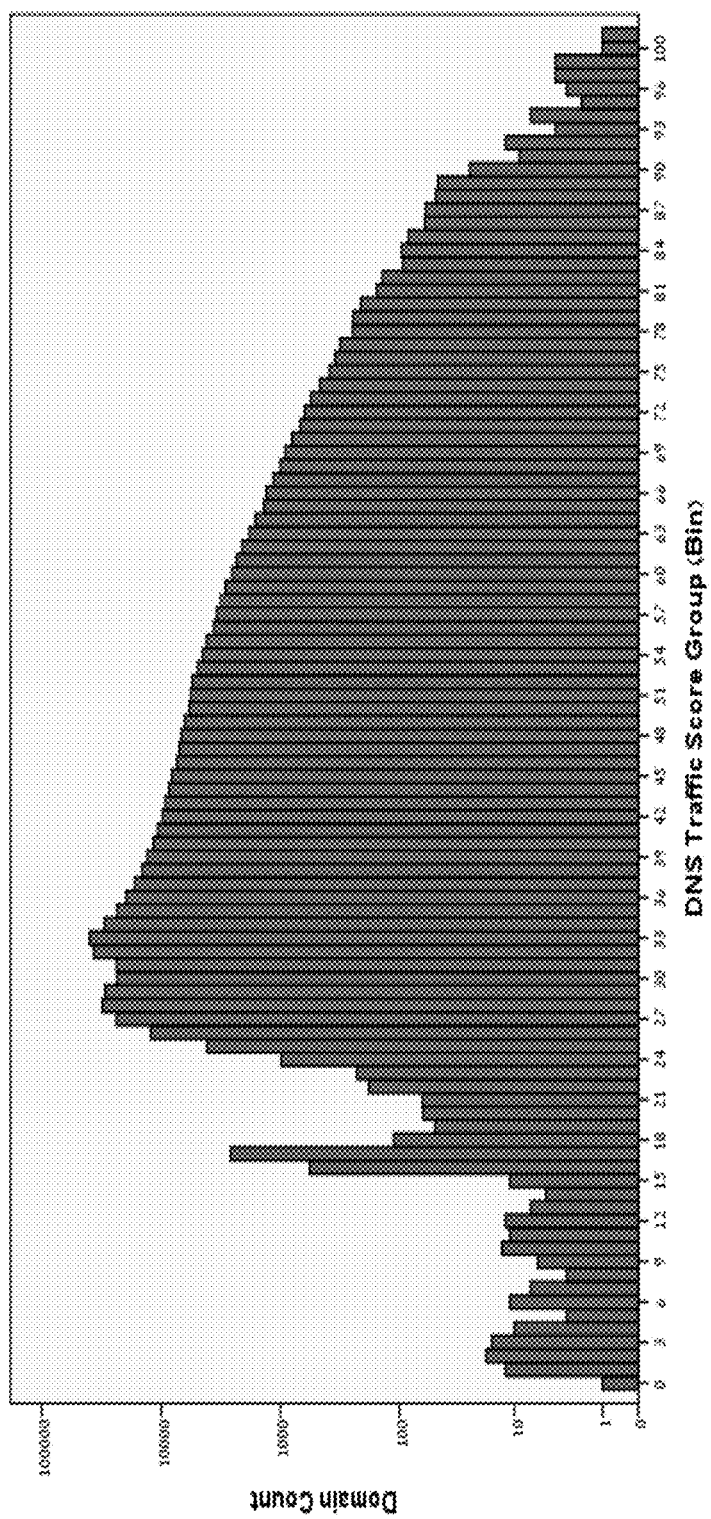
FIG. 9 depicts a chart reflecting numbers of domains grouped according to aspects of the invention.

The inventors have recognized that grouping similar scores can improve the utility of the information to various users. For example, a useful representation of groups may be created by dividing the log of the scores to 100 equal width bins where 1 is the lowest and 100 in the highest. FIG. 9 shows the number of domains in each group.

In embodiments, advertising pricing can be determined based on the group for a domain. For example, a domain in a traffic group between 90-100 may have a different advertising rate applied to it as opposed to a domain in a traffic group between 50-60. It should be noted that these groups are not limited to raw traffic score data and represent a more meaningful and valuable metric based on the methodologies described herein, as well as the broad perspective gained from the level of the TLD server. For example, the inventors have observed that the methodologies discussed herein may identify web sites and domains that are developing traffic at a lower level and in advance of conventional methods. Such results can be obtained, in part, based on the ability of the TLD to aggregate, and evaluate the significance of, traffic from across the Internet.

Figure 5:
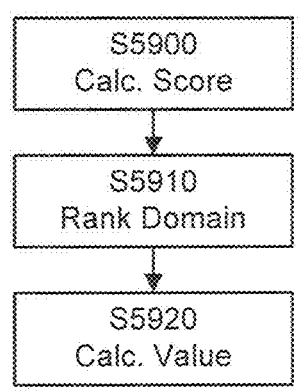
FIG. 5 depicts aspects of an exemplary method in accordance with an embodiment of the present invention.

With reference to FIG. 5, embodiments may include taking a calculated score, such as in S3990, S4900, and/or S5900, and using that score to rank the domain. For example, a calculated traffic score for a domain may be compared against other calculated scores in S5910 in order to rank the domain among other domains on the web. Such rankings can be used in a more intuitive way for users to evaluate an appropriate pricing or value for advertising on a particular domain. The calculated ranks may be distributed as part of a pay service, or used for other purposes including system management, etc. Domain rankings can also be used in the context of commercial services, such as advertising, to calculate a value in S5920. For example, the value of advertising on a particular domain may be linked to a rank-based equation that provides automated online advertising rates. Such systems can be used to evaluate and reward web site developers that are beginning to see significant traffic, in ways that are not possible using current methods. For example, a TLD server, or other vendor with access to the disclosed information, can automatically provide offers from potential advertisers to domains that meet a particular ranking. As indicated above, the inventors have found that it is possible to identify previously unrecognized low-level traffic sites, that may be of interest to potential advertisers, when viewed from the position of the authoritative server, particularly the TLD server.

Figure 6:
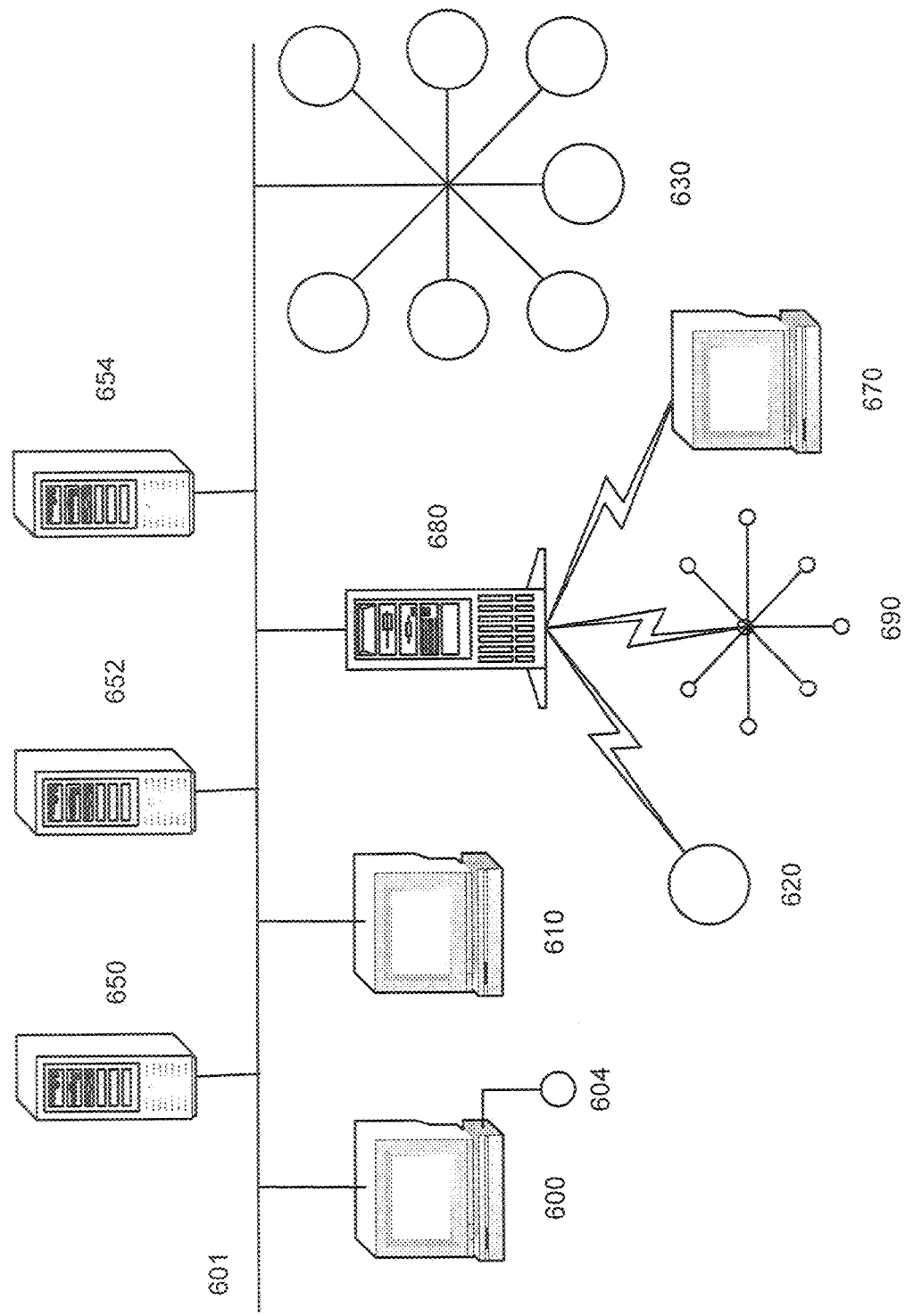
FIG. 6 depicts an exemplary system and related network in accordance with an embodiment of the present invention.

Embodiments of the present invention can include systems for implementing the described methods, as well as computer-readable storage medium coded with instructions for causing a computer to execute the described methods. For example, as shown in FIG. 6, an electronic system 600 including a processor, a memory and an electronic communication device may be configured to request DNS information via ISP server 650. The system 600 may be represent a user computer system, wireless communication devices such as 620, 670, subnetworks such as 630, 690, a server, or any other network-capable device with the requisite functional capabilities. Servers 652, 654 may operate as part of, or separate from, a DNS server associated with a registry.

The system 600 includes any number of processors (not shown) that are coupled to storage devices including a first storage (not shown, typically a random access memory, or "RAM"), second storage (not shown, typically a read only memory, or "ROM"). Both of these storage devices may include any suitable type of the computer-readable media described and/or mentioned above. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The system 600 may also include an interface that includes one or more input/output devices such as such as video monitors, track balls, mice 604, keyboards, microphones, touch-sensitive displays, transducer card readers, magnetic or paper tape readers, tablets, styluses, voice or handwriting recognizers, or other known input devices, including other computers 610. The system 600 may be coupled to a computer or other electronic communication network 690, 680 using a network connection as shown generally at 601. The network can connect various wired, optical, electronic and other known networks to exchange information among computers 610, servers 650, 652, 654, wireless communication devices 620, 670 and sub-networks 690, 630. With such a network connection, it is contemplated that the system 600 and the processor therein may receive information from the network, or may output information to the network in the course of performing the above-described method steps. The above-described devices and materials will be familiar to those of skill in the computer hardware and software arts and need not be individually or exhaustively depicted to be understood by those of skill in the art. The hardware elements described above may be configured (usually temporarily) to act as one or more modules for performing the operations described above.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. An automated method for determining Internet domain traffic, comprising:
   receiving at an authoritative name server a plurality of requests to resolve an Internet domain name, at least two of the plurality of requests having a different number of labels for the Internet domain name separated by periods;
   incrementing, at the authoritative name server, a plurality of counters based on the plurality of requests, at least two of the counters separately counting the at least two requests; and
   calculating a domain traffic score based upon the plurality of counters.

2. The method of claim 1, wherein at least one of the plurality of counters has a limit of one counter per predetermined period of time.

3. The method of claim 1, further comprising:
   calculating a rank of a domain corresponding to the Internet domain name; and
   providing the rank to a user as part of a fee service.

4. The method of claim 1, further comprising:
   calculating a rank of a domain corresponding to the Internet domain name;
   calculating an advertising value for the domain based on the rank; and
   providing the advertising value to a user upon request.

5. The method of claim 1, wherein, calculating the domain traffic score includes applying a weighting factor to at least one of the plurality of counters.

6. The method of claim 1, wherein the leftmost label is the first label and the top level domain is the nth label.

7. The method of claim 1, wherein if a first label of the received Internet domain name includes the string "www", then incrementing a www counter of the plurality of counters for the Internet domain name;
   if the received domain name has only two labels, then incrementing an exact counter of the plurality of counters for the Internet domain name;
   if the first label of the received Internet domain name does not include the string "www" and does not have only two labels, then incrementing another counter for the Internet domain name.

8. The method of claim 7, wherein calculating the domain traffic score comprises:
   calculating an average daily ratio for each of the counters according to:

$$SW\_Ratio(D, P) = \frac{1}{|P|} \cdot \sum_{Day_i \in P} \frac{SW(D, Day_i)}{SW(All, Day_i)}$$

$$SE\_Ratio(D, P) = \frac{1}{|P|} \cdot \sum_{Day_i \in P} \frac{SE(D, Day_i)}{SE(All, Day_i)}$$

$$SO\_Ratio(D, P) = \frac{1}{|P|} \cdot \sum_{Day_i \in P} \frac{SO(D, Day_i)}{SO(All, Day_i)}$$

where:
   W is the www counter; E is the exact counter and O is the other counter;
   D is the Domain; P is a Period (|P| is the size of the period in days); and
   SW(All, Day$_i$), SE(All, Day$_i$), and SO(All, Day$_i$) are the overall numbers of distinct sets of resolvers querying W, E, and O respectively at the authoritative name server; and
   calculating the overall score for the domain within the given period according to:

$$Score(D, P) = \frac{W_W \cdot SW\_Ratio(D, P) + W_E \cdot SE\_Ratio(D, P) + W_O \cdot SO\_Ratio(D, P)}{W_W + W_E + W_O}$$

where $W_{W/E/O}$ is the weight of each of the target types W, E and O respectively.

9. The method of claim 8, wherein $W_W=1$, $W_E=0.5$ and $W_O=0.2$.

* * * * *